US011477117B1

(12) United States Patent
Ramamurthy et al.

(10) Patent No.: US 11,477,117 B1
(45) Date of Patent: Oct. 18, 2022

(54) HIGH-AVAILABILITY SWITCHOVER BASED ON TRAFFIC METRICS

(71) Applicant: Juniper Networks, Inc., Sunnyvale, CA (US)

(72) Inventors: Sai Sundar Ramamurthy, Sunnyvale, CA (US); Sunil Vallamkonda, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 53 days.

(21) Appl. No.: 17/101,128

(22) Filed: Nov. 23, 2020

(51) Int. Cl.
*H04L 45/00* (2022.01)
*H04L 43/10* (2022.01)

(52) U.S. Cl.
CPC .............. *H04L 45/70* (2013.01); *H04L 43/10* (2013.01)

(58) Field of Classification Search
None
See application file for complete search history.

(56) References Cited

U.S. PATENT DOCUMENTS

| 6,728,897 | B1 | 4/2004 | Cramer et al. | |
|---|---|---|---|---|
| 8,363,549 | B1* | 1/2013 | Zhu | H04L 63/0218 709/227 |
| 8,595,546 | B2 | 11/2013 | Dalton | |
| 8,614,941 | B2 | 12/2013 | Heitz | |
| 9,288,183 | B2 | 3/2016 | Lopez et al. | |
| 9,491,042 | B1 | 11/2016 | Vinapamula Venkata | |
| 10,645,204 | B2 | 5/2020 | Dubey et al. | |
| 2011/0179231 | A1* | 7/2011 | Roush | G06F 11/1425 711/147 |
| 2012/0163164 | A1 | 6/2012 | Terry et al. | |
| 2013/0155902 | A1* | 6/2013 | Feng | G06F 11/16 370/255 |
| 2016/0132411 | A1* | 5/2016 | Jolad | G06F 11/2028 714/6.3 |
| 2019/0150150 | A1* | 5/2019 | Calin | H04W 72/0453 370/329 |
| 2019/0230043 | A1* | 7/2019 | Kommula | H04L 47/803 |

FOREIGN PATENT DOCUMENTS

CN 107347014 A 11/2017

* cited by examiner

*Primary Examiner* — Xavier S Wong
(74) *Attorney, Agent, or Firm* — Harrity & Harrity, LLP

(57) ABSTRACT

A node may be an active node associated with a high-availability service and may route session traffic communicated via a first route path between a first endpoint and a second endpoint. The node may determine a first measurement of a traffic metric of the first route path and may receive, from another node associated with the high-availability service, a second measurement of the traffic metric of a second route path. The node may compare the first measurement and the second measurement and determine that the traffic metric is enhanced on the second route path relative to the first route path. The node may cause, via a high-availability link between the node and the other node, the other node to become the active node for routing the session traffic between the first endpoint and the second endpoint.

20 Claims, 11 Drawing Sheets

500

510 — Monitor session traffic communicated via a first route path between a first endpoint and a second endpoint, wherein the first high-availability cluster is within the first route path, and wherein the first high-availability cluster includes an active node for routing the session traffic routed between the first endpoint and the second endpoint 520 — Determine, by the first node, a first measurement of a traffic metric associated with the first route path, wherein the traffic metric is associated with a time period 530 — Receive, by the first node and from a second node of a second high-availability cluster, a second measurement of the traffic metric that is associated with the time period, wherein the second high-availability cluster is within a second route path between the first endpoint and the second endpoint 540 — Compare, by the first node, the first measurement and the second measurement 550 — Determine, by the first node and based on comparing the first measurement and the second measurement, that the traffic metric is enhanced on the second route path relative to the first route path 560 — Cause, by the first node, the second high-availability cluster to establish a new active node for routing the session traffic between the first endpoint and the second endpoint

FIG. 5

HIGH-AVAILABILITY SWITCHOVER BASED ON TRAFFIC METRICS

BACKGROUND

A high-availability cluster may include a plurality of nodes (e.g., network devices) that are linked or connected together to form a logical or virtual node that is more resilient to faults than if the plurality of nodes were to operate in discrete configurations.

SUMMARY

In some implementations, a method includes monitoring, by a first node of a first high-availability cluster, session traffic communicated via a first route path between a first endpoint and a second endpoint, wherein the first high-availability cluster is within the first route path, and wherein the first high-availability cluster includes an active node for routing the session traffic routed between the first endpoint and the second endpoint; determining, by the first node, a first measurement of a traffic metric associated with the first route path, wherein the traffic metric is associated with a time period; receiving, by the first node and from a second node of a second high-availability cluster, a second measurement of the traffic metric that is associated with the time period, wherein the second high-availability cluster is within a second route path between the first endpoint and the second endpoint; comparing, by the first node, the first measurement and the second measurement; determining, by the first node and based on comparing the first measurement and the second measurement, that the traffic metric is enhanced on the second route path relative to the first route path; and causing, by the first node, the second high-availability cluster to establish a new active node for routing the session traffic between the first endpoint and the second endpoint.

In some implementations, a first node includes one or more memories; and one or more processors to route session traffic communicated via a first route path between a first endpoint and a second endpoint, wherein the first node is an active node that routes the session traffic between the first endpoint and the second endpoint via the first route path according to a high-availability service; determine a first measurement of a traffic metric of the first route path, wherein the traffic metric is associated with a time period; receive, from a second node associated with the high-availability service, a second measurement of the traffic metric that is associated with the time period, wherein the second measurement is associated with a second route path; compare the first measurement and the second measurement; determine, based on comparing the first measurement and the second measurement, that the traffic metric is enhanced on the second route path relative to the first route path; and cause, via a high-availability link between the first node and the second node, the second node to become the active node for routing the session traffic between the first endpoint and the second endpoint.

In some implementations, a non-transitory computer-readable medium storing a set of instructions includes one or more instructions that, when executed by one or more processors of a first node, cause the first node to: receive session traffic associated with a communication session between a first endpoint and a second endpoint, wherein the session traffic is received based on the first node being an active node associated with a high-availability service established for the communication session; route the session traffic via a first route path between the first endpoint and the second endpoint; measure a traffic metric of the first route path across a time period; determine that a measurement of the traffic metric fails to satisfy a metric threshold, wherein the metric threshold is dynamically set for the time period; identify, based on the traffic metric satisfying the metric threshold, a second node associated with the high-availability service, wherein the second node is associated with a second route path measured to dynamically set the metric threshold; and cause the second node to become the active node for routing traffic between the first endpoint and the second endpoint via the second route path.

BRIEF DESCRIPTION OF THE DRAWINGS

FIGS. 5-7 are flowcharts of example processes relating to high-availability switchover based on traffic metrics.

DETAILED DESCRIPTION

Figure 1A:
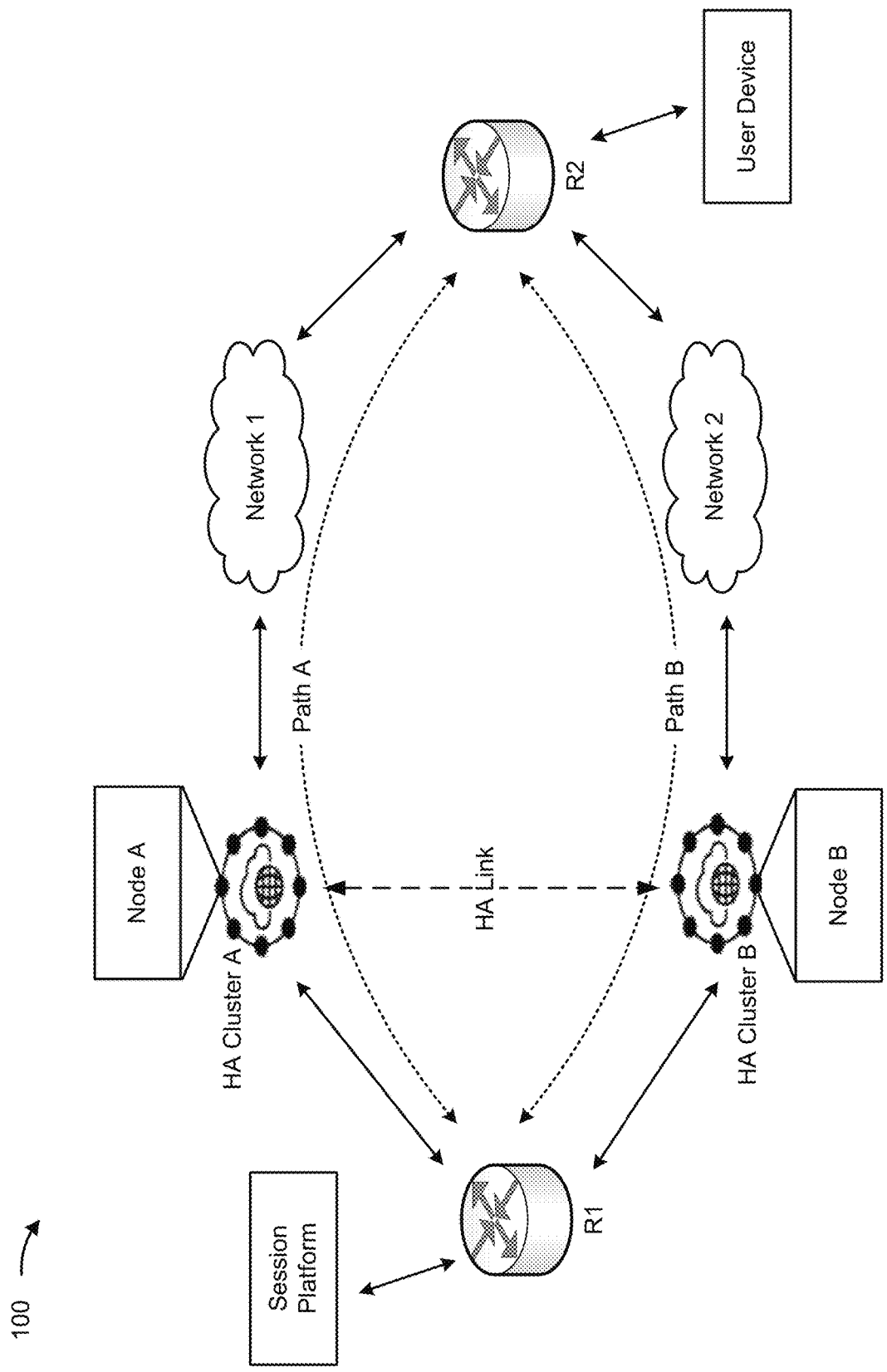
FIGS. 1A-1E are diagrams of an example implementation described herein.

The following detailed description of example implementations refers to the accompanying drawings. The same reference numbers in different drawings may identify the same or similar elements.

Some networks rely on redundancy protection to ensure service availability and business continuity. For example, a set of nodes (e.g., network devices, such as firewalls, routers, gateways, or the like) may be configured as a high-availability (HA) cluster (i.e., a chassis cluster). When configured as a high-availability cluster, the set of nodes provides failover capability in the event of system, software, or hardware failure. In the high-availability cluster, a first node acts as a primary node and a second node acts as a secondary node. In situations where the primary node fails, the secondary node takes over the processing of network traffic and the performing of tasks that were assigned to the failed primary node. Often, the primary node of the HA cluster may become overloaded or otherwise subject to network traffic conditions that impact the primary's node ability to route the network traffic. Consequently, the network traffic may suffer from issues associated with high latency, low bandwidth, high jitter, and/or the like, even though the primary node has not failed. This may result in communication failure, packet data loss, traffic blackholing, and/or the like.

Some implementations described herein provide a node that provides high-availability switchover based on traffic metrics. In some implementations, the node may be an active node associated with a high-availability service (e.g., the node may be included in a high-availability cluster) and may route session traffic communicated via a first route path between a first endpoint device and a second endpoint device. The node may determine a first measurement of a traffic metric (e.g., a latency metric, a bandwidth metric, a jitter metric, and/or the like) of the first route path and may receive, from another node associated with the high-availability service (e.g., the other node may be included in the same high-availability cluster or another high-availability cluster), a second measurement of the traffic metric of a second route path. The node may compare the first measurement and the second measurement and determine that the traffic metric is enhanced on the second route path relative to the first route path. The node may cause, via a high-availability link between the node and the other node, the second node to become the active node for routing the session traffic between the first endpoint and the second endpoint.

In this way, the node described herein automatically allows session traffic to be routed via the second route path based on network traffic conditions associated with the first route path. Accordingly, the node enhances or improves the traffic metric associated with the session traffic and thus prevents, or reduces a likelihood of, communication failure, packet data loss, traffic blackholing, and/or the like. This also increases a robustness of the high-availability service associated with the node and therefore provides a high quality communication experience for users of devices that are associated with the high-availability service.

FIGS. 1A-1E are diagrams of an example implementation 100 associated with HA switchover based on traffic metrics. As shown in FIGS. 1A-1E, example implementation 100 includes multiple endpoint devices (e.g., shown as endpoint device R1 and endpoint device R2) and multiple nodes (e.g., shown as part of HA cluster A or HA cluster B). These devices are described in more detail below in connection with FIGS. 2-4. The multiple nodes may be connected to the endpoint device R2 via one or more networks (e.g., shown in FIGS. 1A-1E as network 1 and network 2).

In some implementations, the endpoint device R1 may be associated with a session service provider (e.g., for an application, a streaming media service, and/or the like). As shown in FIG. 1A, the endpoint device may be connected to a session platform of the session service provider. The session platform may provide session traffic (e.g., application traffic, streaming media traffic, and/or the like) to the endpoint device R1, which may send the session traffic to the endpoint device R2 (e.g., via the multiple nodes and/or the one or more networks). As further shown in FIG. 1A, the endpoint device R2 may be connected to a user device (e.g., of a customer of the session service provider) and may provide the session traffic to the user device (e.g., for display on a display of the user device).

In some implementations, the endpoint device R1 may be connected to one or more HA clusters, where an HA cluster includes two or more nodes. For example, as shown in FIG. 1A, the endpoint device R1 may be connected to an HA cluster A and an HA cluster B, where HA cluster A includes n nodes (where n≥2) and HA cluster B includes m nodes (where m≥2). A node A (e.g., an HA node) may be the primary node of the HA cluster A, and a node B (e.g., an HA node) may be the primary node of the HA cluster B.

The HA cluster A and the HA cluster B may provide a high-availability service, such that one HA cluster, of the HA cluster A and the HA cluster B, may be an active HA cluster that routes the session traffic between endpoint device R1 and endpoint device R2, and another HA cluster, of the HA cluster A and the HA cluster B, may be a backup HA cluster (e.g., that routes the session traffic when HA cluster A fails). Accordingly, in some implementations, when the HA cluster A is the active HA cluster, the node A (e.g., because the node A is the primary node of the HA cluster A) is an active node that routes the session traffic, and the node B (e.g., because the node B is the primary node of the HA cluster B) is a backup node. When the HA cluster B is the active HA cluster, the node B (e.g., because the node B is the primary node of the HA cluster B) is the active node that routes the session traffic and the node A (e.g., because the node A is the primary node of the HA cluster A) is the backup node.

While some implementations described herein are directed to the endpoint device R1 connected to the HA cluster A and the HA cluster B, other configurations are possible. In a first example, the endpoint device R1 may be connected to a first set of nodes (e.g., that is not an HA cluster) and a second set of nodes (e.g., that is not an HA cluster), where a first node (e.g., a node A) of the first set of nodes acts as a primary node of the first set of nodes and a second node (e.g., a node B) of the second set of nodes acts as a primary node of the second set of nodes. In a second example, the endpoint device R1 may be connected to a first node (e.g., a node A) and a second node (e.g., a node B) (e.g., where the first node and second node are not included in an HA cluster). Accordingly, in either the first example or the second example, one node, of the first node and the second node, may be an active node that routes the session traffic between the endpoint device R1 and endpoint device R2 and another node, of the first node and the second node, may be a backup node.

In some implementations, the HA cluster A may be physically separate from the HA cluster B. For example, a physical distance between a node of the HA cluster A and a node of the HA cluster B may satisfy (e.g., be greater than or equal to) a physical distance threshold. The HA cluster A may be connected to the HA cluster B via an HA link (e.g., an internet protocol (IP) link, a multiprotocol label switching (MPLS) link, and/or the like). The HA link may connect some or all nodes of the HA cluster A to the HA cluster B. For example, the HA link may connect the node A and the node B.

As further shown in FIG. 1A, the HA cluster A may be connected to network 1 and the HA cluster B may be connected to network 2. Accordingly, the node A may be connected to network 1 and the node B may be connected to network 2. Network 1 and network 2 may be separate networks (e.g., provided by separate network service providers). In some implementations, the HA cluster A and the HA cluster B (and the endpoint device R2) may be connected to the same network.

As further shown in FIG. 1A, a path A and a path B may exist between the endpoint device R1 and the endpoint device R2, such that the endpoint device R1 and the endpoint device R2 may communicate the session traffic via the path A or the path B. The path A may originate at the endpoint device R1, traverse the HA cluster A (e.g., that includes the node A) and the network 1, and terminate at the endpoint device R2. The path B may originate at the endpoint device R1, traverse the HA cluster B (e.g., that includes the node B) and the network 2, and terminate at the endpoint device R2. Accordingly, the endpoint device R1 and the endpoint device R2 may communicate the session traffic via path A when the HA cluster A is active (e.g., when the node A is active) and may communicate the session traffic via path B when the HA cluster B is active (e.g., when the node B is active).

Figure 1B:
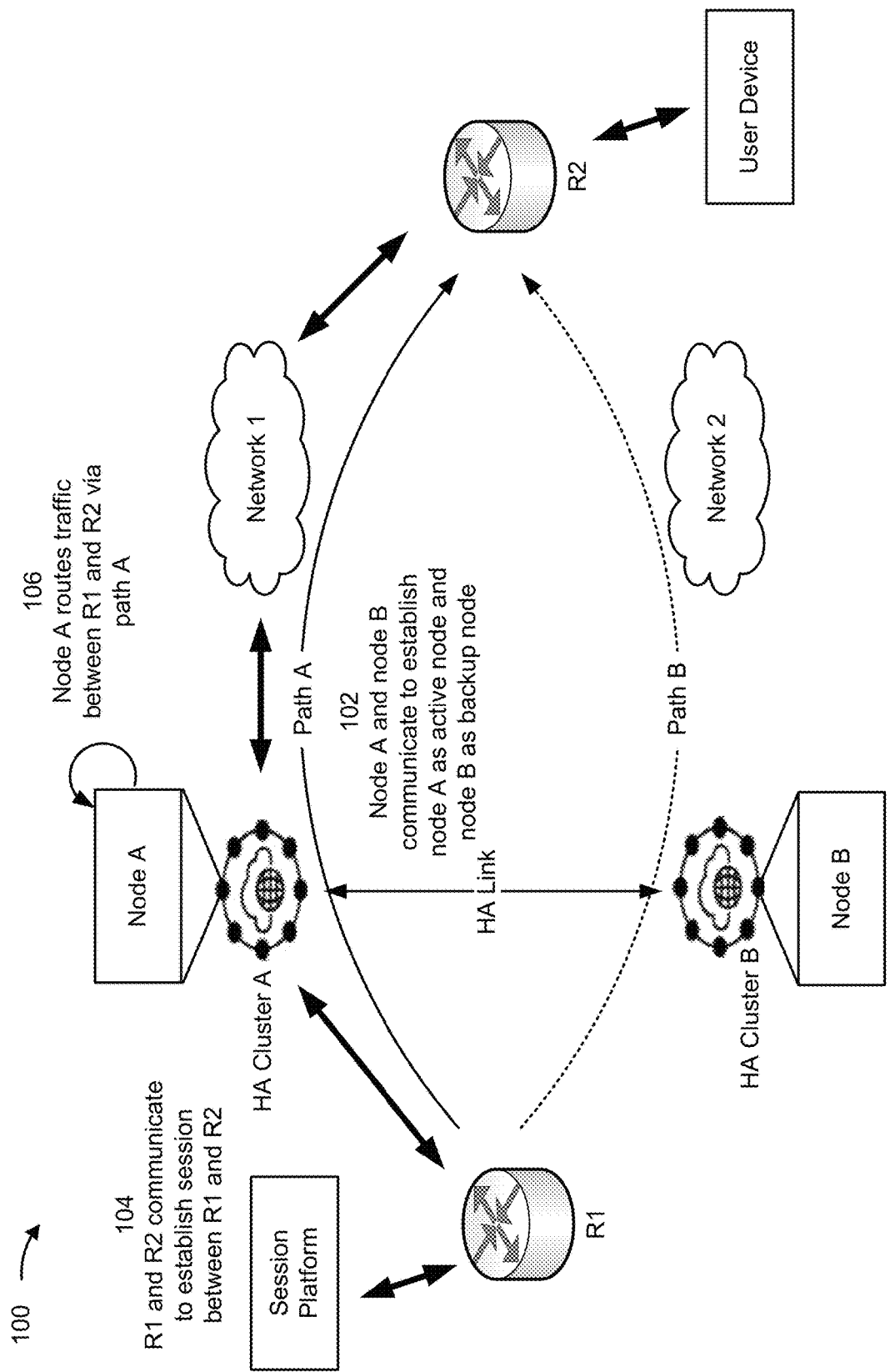

Turning to FIG. 1B, the HA cluster A (e.g., one or more nodes of the HA cluster A) and the HA cluster B (e.g., one or more nodes of the HA cluster B) may communicate via the HA link to establish an active HA cluster and a backup HA cluster for the endpoint device R1 (e.g., by communicating border gateway protocol (BGP) messages). Additionally, or alternatively, the node A may communicate with the node B via the HA link to establish an active node and a backup node for the endpoint device R1. For example, as shown by reference number 102, the node A may communicate with the node B to establish the node A as the active node and the node B as the backup node for the endpoint device R1 (and/or to establish HA cluster A as the active HA cluster and HA cluster B as the backup HA cluster).

As further shown in FIG. 1B, and by reference number 104, the endpoint device R1 and the endpoint device R2 may communicate to establish a session between the endpoint device R1 and the endpoint device R2. For example, the endpoint device R1 and the endpoint device R2 may communicate messages (e.g., BGP messages) via path A (e.g., that traverses the HA cluster A and/or the node A and the network 1) to establish the session. In some implementations (e.g., after the session is established), the endpoint device R1 and the endpoint device R2 may communicate session traffic via path A. Accordingly, as further shown in FIG. 1B, and by reference number 106, node A (and/or other nodes of the HA cluster A) may receive and route the session traffic between the endpoint device R1 and the endpoint device R2 (e.g., via the path A).

Figure 1C:
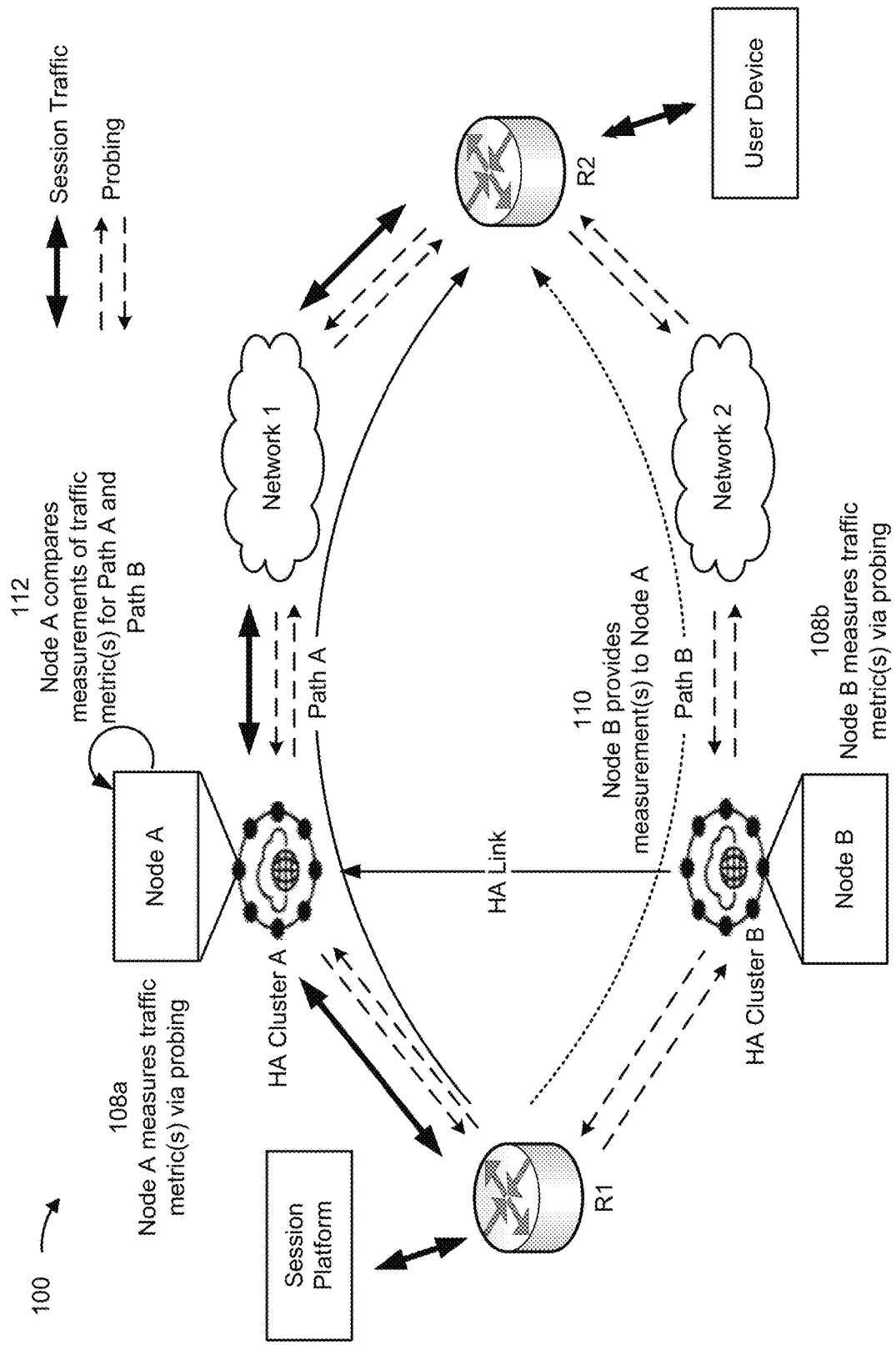

Turning to FIG. 1C, and reference number 108*a*, the node A may measure one or more traffic metrics associated with the path A. A traffic metric associated with the path A may include, for example, a latency metric associated with the path A, a bandwidth metric associated with the path A, a jitter metric associated with the path A, and/or the like. In some implementations, to measure the one or more traffic metrics associated with the path A, the node A may transmit probe messages (e.g., dynamic probing messages, such as real-time performance monitoring (RPM) messages, two-way active measurement protocol (TWAMP) messages, and/or application quality of experience (AppQoE) messages, among other examples) to the endpoint device R1 and/or the endpoint device R2 (e.g., via the path A). In response, the endpoint device R1 and/or the endpoint device R2 may send response messages to the node A (e.g., via the path A). The node A may receive the response messages from the endpoint device R1 and/or the endpoint device R2 and may determine measurements of the one or more traffic metrics based on the response messages. For example, the node A may determine a measurement of a latency metric and/or a measurement of a jitter metric associated with the path A by comparing a time of transmission of one or more probe messages and a time of receipt of one or more corresponding response messages. As another example, the node A may determine a measurement of a bandwidth metric associated with the path A by comparing an amount of time between reception of individual response messages.

In some implementations, the node A may determine a measurement of a traffic metric based on response messages received by the node A during a time period (e.g., the most recent 5 seconds, 10 seconds, 20 seconds, 60 seconds, or 100 seconds, among other examples). For example, the node A may determine a number of individual measurements of the traffic metric during the time period and may combine (e.g., average) the individual measurements to determine the measurement of the traffic for the time period.

As further shown in FIG. 1C, and reference number 108*b*, the node B may measure one or more traffic metrics associated with the path B (e.g., in a similar manner to that described herein in relation to reference number 108*a*). For example, the node B may transmit probe messages to the endpoint device R1 and/or the endpoint device R2 (e.g., via the path B). In response, the endpoint device R1 and/or the endpoint device R2 may send response messages to the node B (e.g., via the path B). The node B may receive the response messages from the endpoint device R1 and/or the endpoint device R2 and may determine measurements of the one or more traffic metrics based on the response messages. In some implementations, the node B may determine a measurement of a traffic metric based on response messages received by the node B during a time period (e.g., the same time period described above in relation to reference number 108*a* or a different time period). For example, the node B may determine a number of individual measurements of the traffic metric during the time period and may combine (e.g., average) the individual measurements to determine the measurement of the traffic for the time period.

As further shown in FIG. 1C, and by reference number 110, the node B may provide, to the node A, the measurements of the one or more traffic metrics associated with the path B. For example, the node B may send a measurement of a traffic metric (e.g., that is associated with a time period) to the node A via the HA link.

As further shown in FIG. 1C, and by reference number 112, the node A may compare measurements of one or more traffic metrics associated with the path A (e.g., that were determined by the node A as described herein in relation to reference number 108*a*) and corresponding measurements of the one or more traffic metrics associated with the path B (e.g., that were determined by the node B as described herein in relation to reference number 108*b* and received by the node A as described herein in relation to reference number 110). In some implementations, for a particular traffic metric, the node A may establish a measurement of the particular traffic metric that is associated with the path B as a threshold for the particular traffic metric (e.g., the node A may dynamically set the threshold to be the measurement of the particular traffic metric that is associated with the path B). Accordingly, the node A may determine whether the measurement of the particular traffic metric associated with the path A satisfies the threshold.

For example, when the particular traffic metric is a latency metric, the node A may determine whether a measurement of latency associated with the path A is less than or equal to a latency threshold (e.g., that is equal to a measurement of latency associated with the path B). As another example, when the particular traffic metric is a bandwidth metric, the node A may determine whether a measurement of bandwidth associated with the path A is greater than a bandwidth threshold (e.g., that is equal to a measurement of bandwidth associated with the path B). In an additional example, when the particular traffic metric is a jitter metric, the node A may determine whether a measurement of jitter associated with the path A is less than or equal to a jitter threshold (e.g., that is equal to a measurement of jitter associated with the path B).

When the node A determines that the measurement of the particular traffic metric associated with the path A satisfies the threshold, the node A may continue to receive and route the session traffic between the endpoint device R1 and the endpoint device R2 via the path A. When the node A determines that the measurement of the particular traffic metric associated with the path A fails to satisfy the threshold, the node A may determine that the particular traffic metric is enhanced on the path B relative to the path A (e.g., that the path B may provide a better performance with respect to the particular traffic metric than the path A). For example, when the particular traffic metric is a latency metric, the node A may determine that the latency metric is less on the path B relative to the path A. As another example, when the particular traffic metric is a bandwidth metric, the node A may determine that the bandwidth metric is higher on the path B relative to the path A. In an additional example, when the particular traffic metric is a jitter metric, the node A may determine that the jitter metric is less on the path B relative to the path A.

Figure 1D:
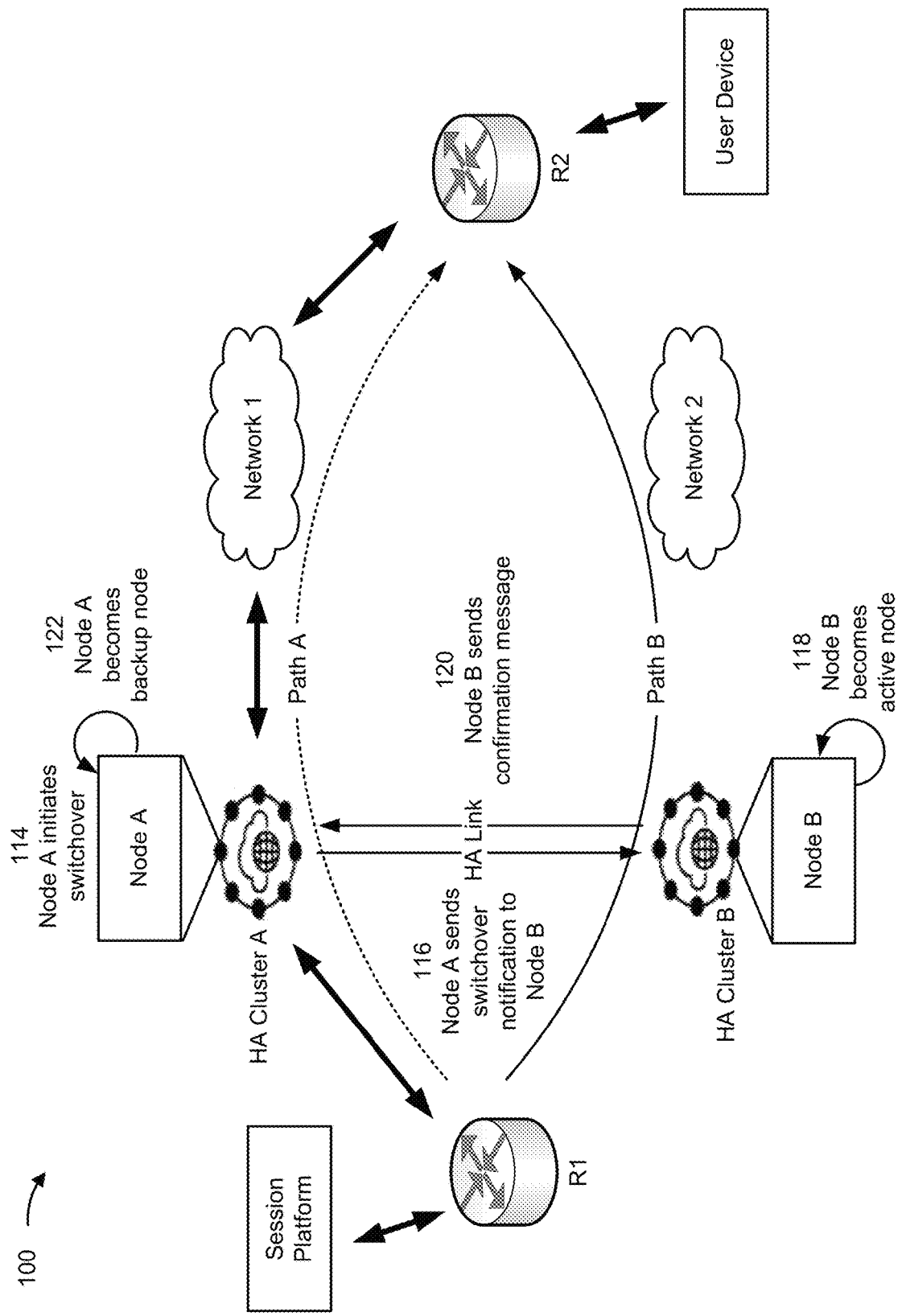

Turning to FIG. 1D, and reference number 114, the node A may initiate a switchover (e.g., based on the node A determining that the measurement of the particular traffic metric associated with the path A fails to satisfy the threshold) to cause the node B to become the active node for routing the session traffic between the endpoint device R1 and the endpoint device R2 (e.g., via the path B). Additionally, or alternatively, the node A may initiate a switchover to cause the HA cluster B to become the active HA cluster for routing the session traffic between the endpoint device R1 and the endpoint device R2 (e.g., via the path B).

As further shown in FIG. 1D, and by reference number 116, the node A may send a switchover notification to the node B (e.g., via the HA link that connects the node A and the node B). The switchover notification may indicate, for example, that the node B is to be the active node and that the node A is to be the backup node for the endpoint device R1 (e.g., as part of the high-availability service for the endpoint device R1) and/or that the node B is to cause a member node of the HA cluster B to be the active node for routing the session traffic for the HA cluster B. Accordingly, as further shown in FIG. 1D, and by reference number 118, the node B may become the active node for the endpoint device R1. For example, based on receiving the switchover notification, the node B may update one or more settings and/or parameters of the node B to cause the node B to be the active node for the endpoint device R1. In some implementations, the node B may communicate with another node of the HA cluster B to cause the other node of the cluster B to be the active node for the endpoint device R1.

As further shown in FIG. 1D, and by reference number 120, the node B may send a confirmation message to the node A (e.g., via the HA link that connects the node A and the node B). The confirmation message may indicate that the node B (or another node of the HA cluster B) is the active node for the endpoint device R1 and/or may indicate that the node A (or another node of the HA cluster A) is to be the backup node for the endpoint device R1. Accordingly, as further shown in FIG. 1D, and by reference number 122, the node A may become the backup node. For example, based on receiving the switchover notification, the node A may update, for example, one or more settings and/or parameters of the node A to cause the node A to be the backup node for the endpoint device R1. In some implementations, the node A may communicate with another node of the HA cluster A to cause the other node of the cluster A to be the backup node for the endpoint device R1.

Figure 1E:
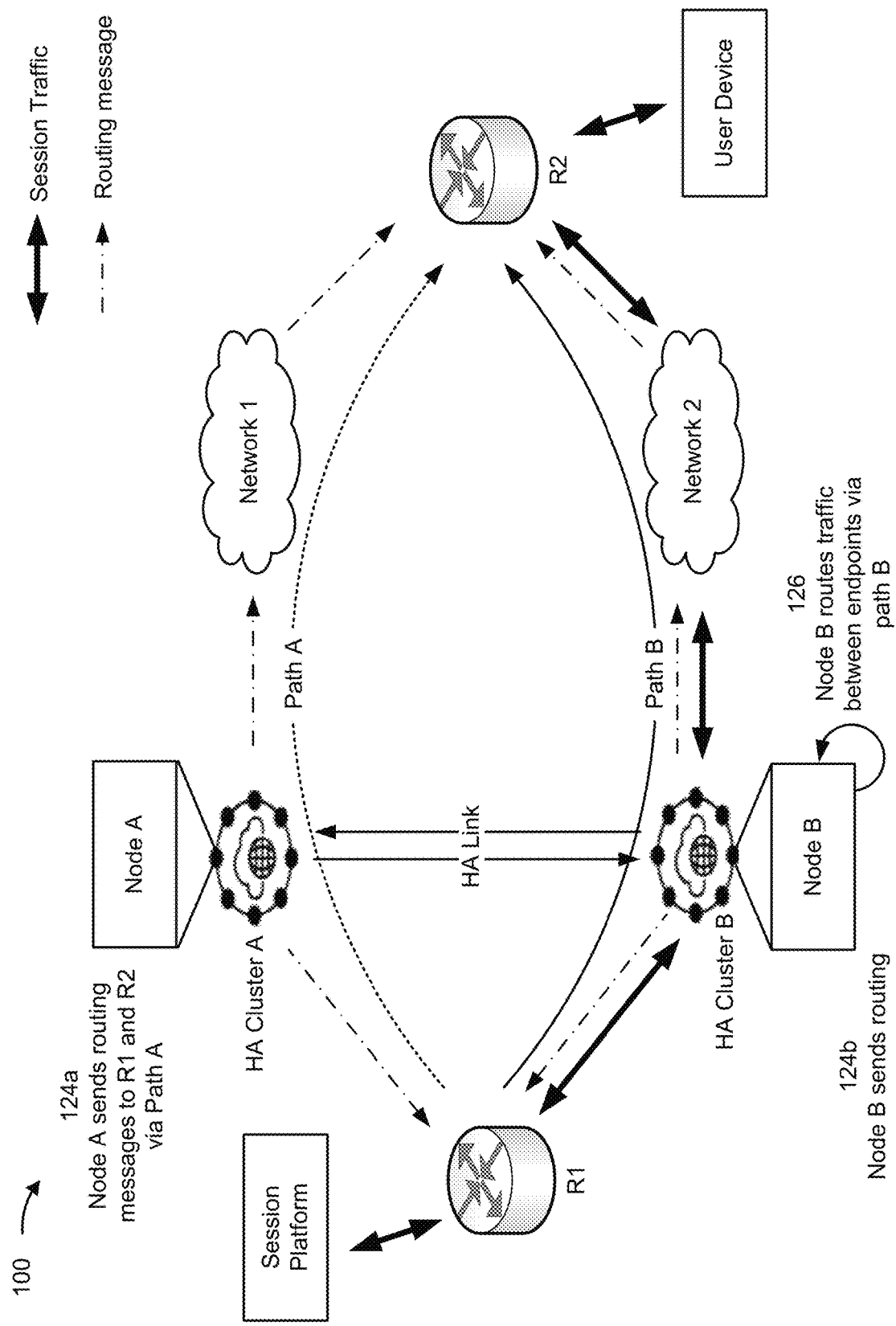

Turning to FIG. 1E, and reference number 124*a*, the node A may send routing messages (e.g., BGP messages) to endpoint device R1 and/or endpoint device R2 (e.g., via path A). As further shown in FIG. 1E, and by reference number 124*b*, the node B may send routing messages to endpoint device R1 and/or endpoint device R2 (e.g., via path B). A routing message may indicate that the node B is the active node for the endpoint device R1 and/or that the node A is the backup node for the endpoint device R1. Additionally, or alternatively, the routing message may indicate that the HA cluster B is the active HA cluster for the endpoint device R1 and/or that the HA cluster A is the backup HA cluster for the endpoint device R1.

As further shown in FIG. 1E (e.g., after the endpoint device R1 and the endpoint device R2 receive the routing messages), the endpoint device R1 and the endpoint device R2 may communicate session traffic via path B. Accordingly, as further shown in FIG. 1E, and by reference number 126, the node B and/or other nodes of the HA cluster B may receive and route the session traffic between the endpoint device R1 and the endpoint device R2 via the path B.

In some implementations, the node B (e.g., when routing the session traffic) may measure one or more traffic metrics associated with the path B (e.g., in a similar manner as that described herein in relation to FIG. 1C and reference number 108*a*). For example, the node B may transmit probe messages to the endpoint device R1 and/or the endpoint device R2 (e.g., via the path B) and may determine measurements of the one or more traffic metrics based on response messages to the probe messages. The node A may measure one or more traffic metrics associated with the path A (e.g., in a similar manner as that described herein in relation to FIG. 1C and reference number 108*b*) and may provide, to the node B, measurements of the one or more traffic metrics associated with the path A via the HA link (e.g., in a similar manner as that described herein in relation to FIG. 1C and reference number 110).

The node B may compare the measurements of one or more traffic metrics associated with the path B and the measurements of the one or more traffic metrics associated with the path A and may determine that a particular traffic metric is enhanced on the path A relative to the path B (e.g., in a similar manner as that described herein in relation to FIG. 1C and reference number 112). Accordingly, the node B may cause a switchover (e.g., in a similar manner as that described herein in relation to FIG. 1D and reference numbers 114-122 and FIG. 1E and reference numbers 124*a*-124*b*) to cause the node A to become the active node for routing the session traffic between the endpoint device R1 and the endpoint device R2 (e.g., via the path A) and/or to cause the HA cluster A to become the active HA cluster for routing the session traffic between the endpoint device R1 and the endpoint device R2 (e.g., via the path A). The node A and/or other nodes of the HA cluster A then may receive and route the session traffic between the endpoint device R1 and the endpoint device R2 via the path A (e.g., in a similar manner as that described herein in relation to FIG. 1E and reference number 126).

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
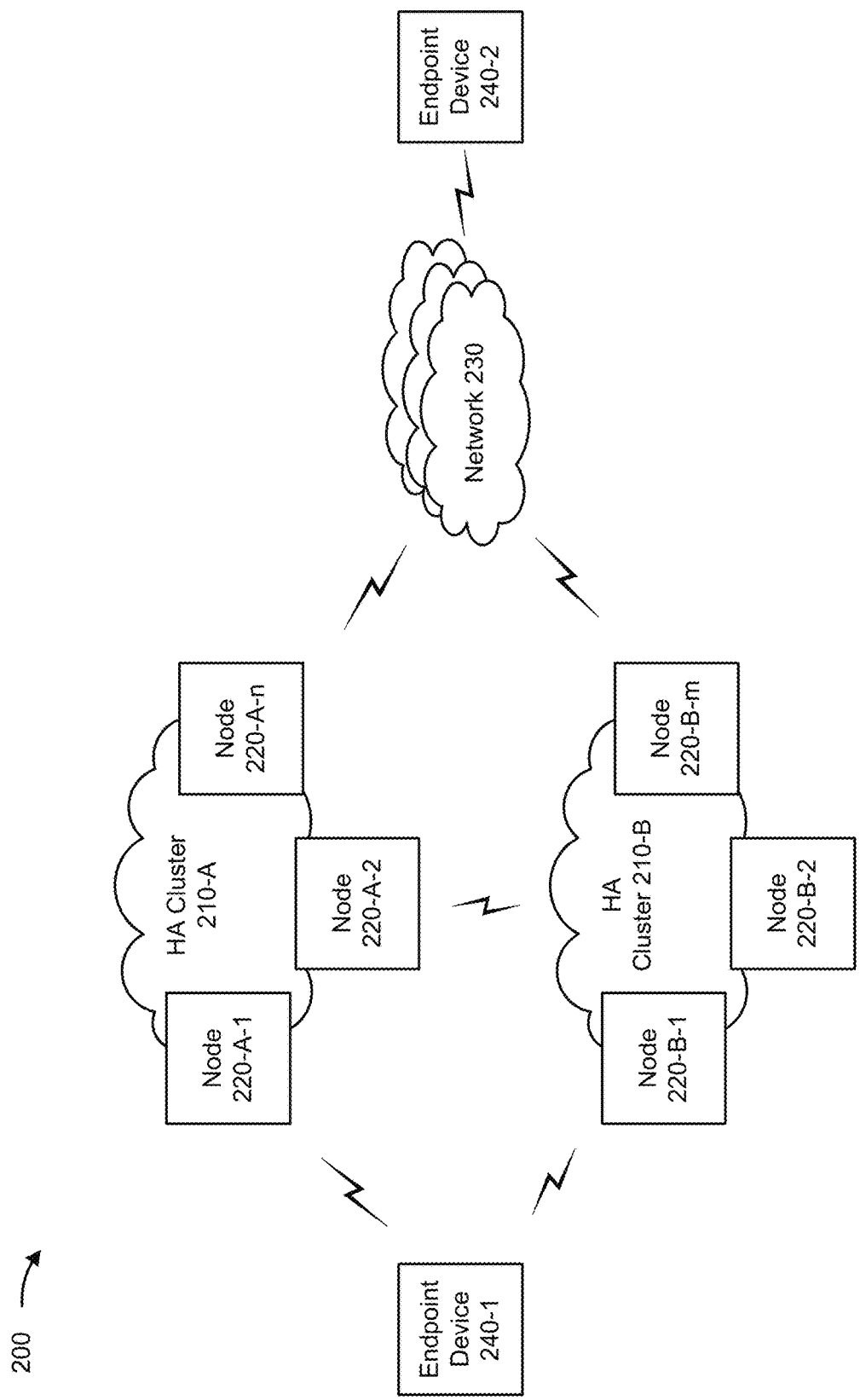
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include one or more HA clusters 210 (shown as HA cluster 210-A and HA cluster 210-B), a group of nodes 220 (shown as node 220-A-1 through node 220-A-n and node 220-B-1 through node 220-B-m), one or more networks 230, and multiple endpoint devices 240 (shown as endpoint device 240-1 and endpoint device 240-2). Devices of environment 200 may interconnect via wired connections, wireless connections, or a combination of wired and wireless connections.

As described above in connection with FIGS. 1A-1E, two or more nodes 220 may be linked, connected, and/or configured to form the HA cluster 210. For example, the nodes 220 may form a logical or virtual node (which may be referred to as a chassis cluster) that is more resilient to faults than if the nodes 220 were to operate in discrete configurations. The nodes 220 in the HA cluster 210 may share information associated with routing session traffic.

Node 220 includes one or more devices capable of receiving, processing, storing, routing, and/or providing traffic (e.g., a packet, other information or metadata, and/or the like) in a manner described herein. For example, node 220 may include a router, such as a label switching router (LSR), a label edge router (LER), an ingress router, an egress router, a provider router (e.g., a provider edge router, a provider core router, and/or the like), a virtual router, and/or the like. Additionally, or alternatively, node 220 may include a gateway, a switch, a firewall, a hub, a bridge, a reverse proxy, a server (e.g., a proxy server, a cloud server, a data center server, and/or the like), a load balancer, and/or a similar device. In some implementations, node 220 may measure one or more traffic metrics associated with a routing path and may provide measurements of the one or more traffic metrics to another node 220 to facilitate high-availability switchover. In some implementations, node 220 may be a physical device implemented within a housing, such as a chassis. In some implementations, node 220 may be a virtual device implemented by one or more computer devices of a cloud computing environment or a data center.

Network 230 includes one or more wired and/or wireless networks. For example, network 230 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

Endpoint device 240 includes one or more devices capable of receiving, generating, storing, processing, and/or providing information, such as information described herein. For example, endpoint device 240 may include a mobile phone (e.g., a smart phone, a radiotelephone, and/or the like), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, and/or the like), a network device, or a similar type of device. In some implementations, endpoint device 240 may receive session traffic from and/or may provide session traffic to other endpoint devices 240 via network 230 (e.g., by routing packets using an HA cluster 210 and/or a node 220 as intermediaries).

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
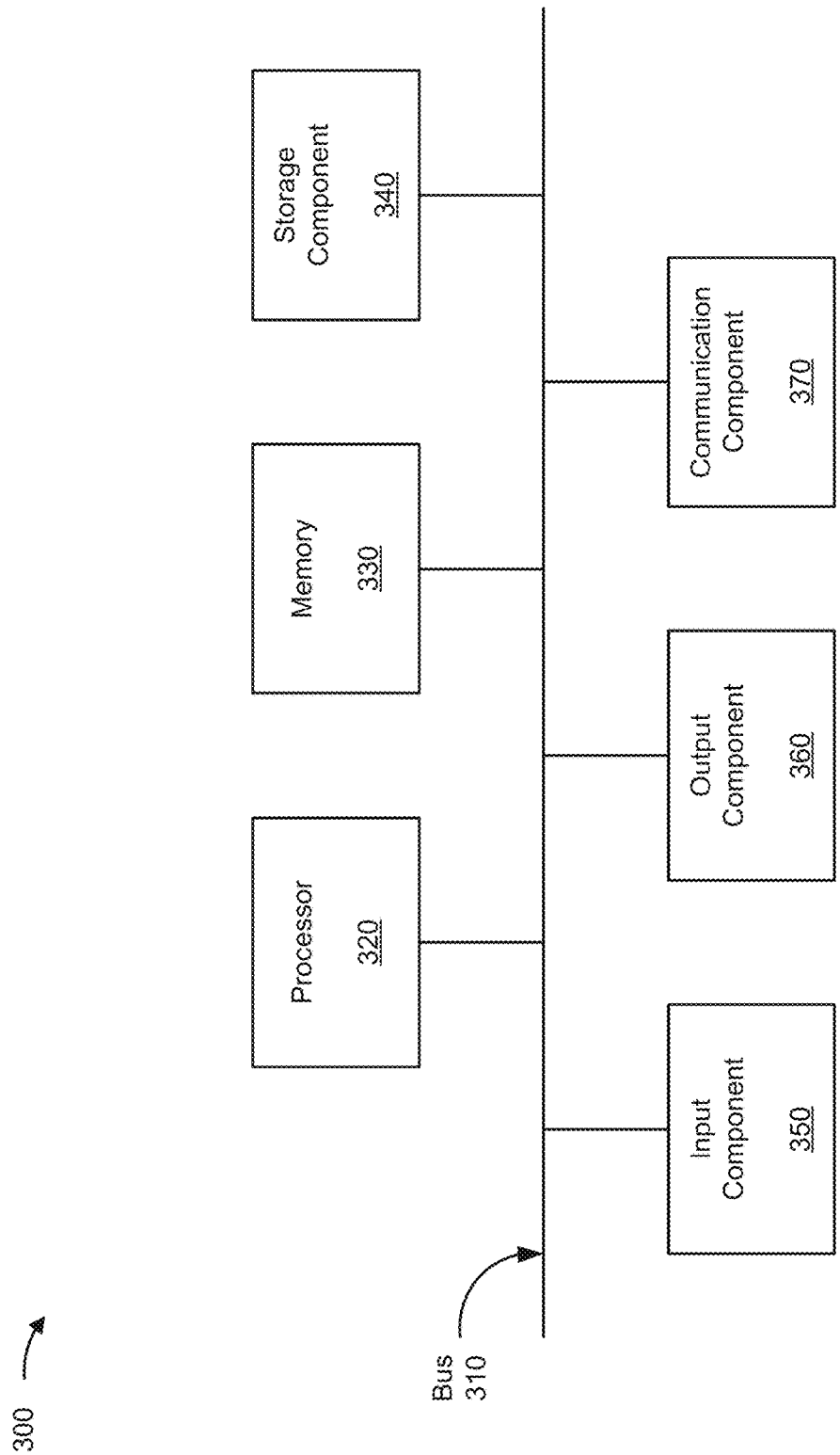
FIGS. 3-4 are diagrams of example components of one or more devices of FIG. 2.

FIG. 3 is a diagram of example components of a device 300, which may correspond to node 220 and/or endpoint device 240. In some implementations, node 220 and/or endpoint device 240 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
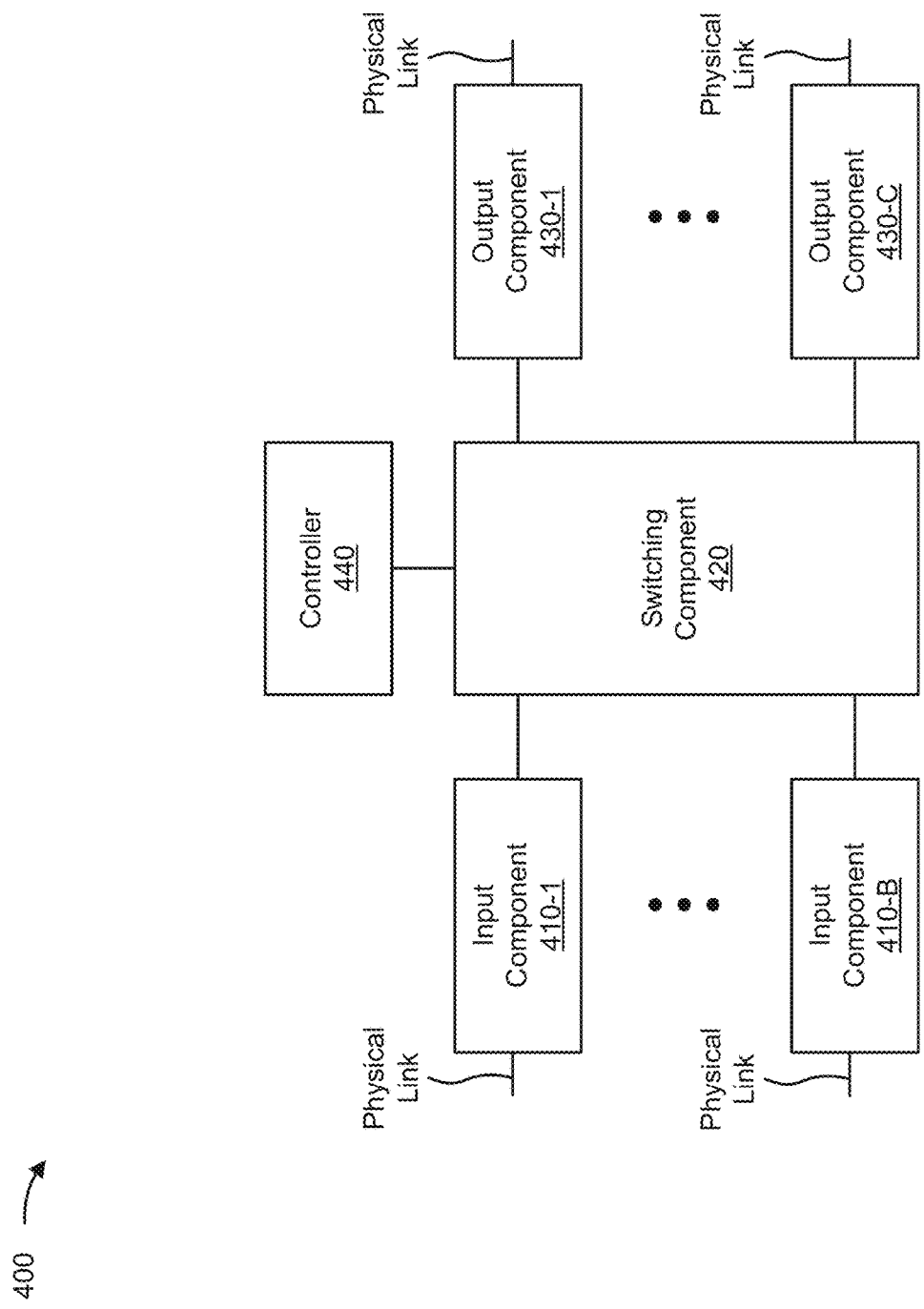

FIG. 4 is a diagram of example components of a device 400. Device 400 may correspond to node 220 and/or endpoint device 240. In some implementations, node 220 and/or endpoint device 240 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software. In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with high-availability switchover based on traffic metrics. In some implementations, one or more process blocks of FIG. 5 may be performed by a first node (e.g., node 220). In some implementations, one or more process blocks of FIG. 5 may be performed by another device or a group of devices separate from or including the node, such as an endpoint device (e.g., endpoint device 240). In some implementations, the first node may be a first node of a first high-availability cluster. Additionally, or alternatively, one or more process blocks of FIG. 5 may be performed by one or more components of device 300, such as processor 320, memory 330, storage component 340, input component 350, output component 360, and/or communication component 370; one or more components of device 400, such as input component 410, switching component 420, output component 430, and/or controller 440; and/or the like.

As shown in FIG. 5, process 500 may include monitoring session traffic communicated via a first route path between a first endpoint and a second endpoint, wherein the first high-availability cluster is within the first route path, and wherein the first high-availability cluster includes an active node for routing the session traffic routed between the first endpoint and the second endpoint (block 510). For example, the first node may monitor session traffic communicated via a first route path between a first endpoint and a second endpoint, as described above. In some implementations, the first high-availability cluster is within the first route path. In some implementations, the first high-availability cluster includes an active node for routing the session traffic routed between the first endpoint and the second endpoint.

As further shown in FIG. 5, process 500 may include determining a first measurement of a traffic metric associated with the first route path, wherein the traffic metric is associated with a time period (block 520). For example, the first node may determine a first measurement of a traffic metric associated with the first route path, as described above. In some implementations, the traffic metric is associated with a time period.

As further shown in FIG. 5, process 500 may include receiving, from a second node of a second high-availability cluster, a second measurement of the traffic metric that is associated with the time period, wherein the second high-availability cluster is within a second route path between the first endpoint and the second endpoint (block 530). For example, the first node may receive, from a second node of a second high-availability cluster, a second measurement of the traffic metric that is associated with the time period, as described above. In some implementations, the second high-availability cluster is within a second route path between the first endpoint and the second endpoint.

As further shown in FIG. 5, process 500 may include comparing the first measurement and the second measurement (block 540). For example, the first node may compare the first measurement and the second measurement, as described above.

As further shown in FIG. 5, process 500 may include determining, based on comparing the first measurement and the second measurement, that the traffic metric is enhanced on the second route path relative to the first route path (block 550). For example, the first node may determine, based on comparing the first measurement and the second measurement, that the traffic metric is enhanced on the second route path relative to the first route path, as described above.

As further shown in FIG. 5, process 500 may include causing the second high-availability cluster to establish a new active node for routing the session traffic between the first endpoint and the second endpoint (block 560). For example, the first node may cause the second high-availability cluster to establish a new active node for routing the session traffic between the first endpoint and the second endpoint, as described above.

Process 500 may include additional implementations, such as any single implementation or any combination of implementations described below and/or in connection with one or more other processes described elsewhere herein.

In a first implementation, the second node is a primary node of the second high-availability cluster.

In a second implementation, alone or in combination with the first implementation, the second measurement is received via a high-availability link that connects the first high-availability cluster and the second high-availability cluster.

In a third implementation, alone or in combination with one or more of the first and second implementations, the second high-availability cluster is a backup cluster for the session traffic.

In a fourth implementation, alone or in combination with one or more of the first through third implementations, determining the first measurement of the traffic metric comprises performing a dynamic probing of the first route path by transmitting probe messages to the first endpoint and the second endpoint, and receiving response messages from the first endpoint and the second endpoint.

In a fifth implementation, alone or in combination with one or more of the first through fourth implementations, causing the second high-availability cluster to establish the new active node comprises sending, via a high-availability link, a switchover notification to the second node, wherein the switchover notification indicates that the second node is to cause a member node of the second high-availability cluster to be the active node for routing the session traffic.

In a sixth implementation, alone or in combination with one or more of the first through fifth implementations, process 500 includes receiving, from the second node, a confirmation message that identifies that the second high-availability cluster has established the new active node, and designating, based on receiving the confirmation message, a third node of the first high-availability cluster as a backup node for subsequent session traffic.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
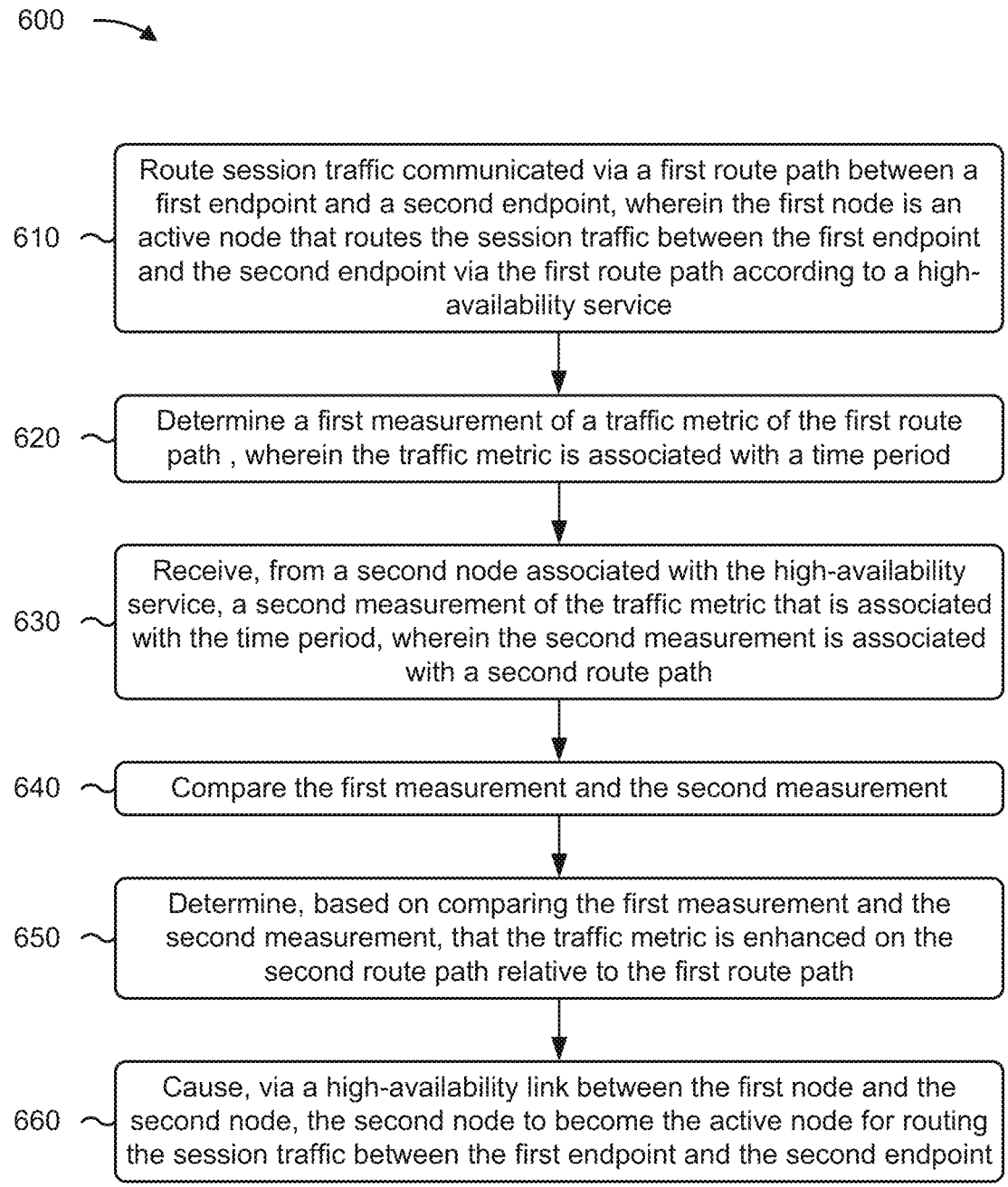

FIG. 6 is a flowchart of an example process 600 associated with high-availability switchover based on traffic metrics. In some implementations, one or more process blocks of FIG. 6 may be performed by a first node (e.g., node 220). In some implementations, one or more process blocks of FIG. 5 may be performed by another device or a group of devices separate from or including the node, such as an endpoint device (e.g., endpoint device 240 Additionally, or alternatively, one or more process blocks of FIG. 5 may be performed by one or more components of device 300, such as processor 320, memory 330, storage component 340, input component 350, output component 360, and/or communication component 370; one or more components of device 400, such as input component 410, switching component 420, output component 430, and/or controller 440; and/or the like.

As shown in FIG. 6, process 600 may include routing session traffic communicated via a first route path between a first endpoint and a second endpoint, wherein the first node is an active node that routes the session traffic between the first endpoint and the second endpoint via the first route path according to a high-availability service (block 610). For example, the first node may route session traffic communicated via a first route path between a first endpoint and a second endpoint, as described above. In some implementations, the first node is an active node that routes the session traffic between the first endpoint and the second endpoint via the first route path according to a high-availability service.

As further shown in FIG. 6, process 600 may include determining a first measurement of a traffic metric of the first route path, wherein the traffic metric is associated with a time period (block 620). For example, the first node may determine a first measurement of a traffic metric of the first route path, as described above. In some implementations, the traffic metric is associated with a time period.

As further shown in FIG. 6, process 600 may include receiving, from a second node associated with the high-availability service, a second measurement of the traffic metric that is associated with the time period, wherein the second measurement is associated with a second route path (block 630). For example, the first node may receive, from a second node associated with the high-availability service, a second measurement of the traffic metric that is associated with the time period, as described above. In some implementations, the second measurement is associated with a second route path.

As further shown in FIG. 6, process 600 may include comparing the first measurement and the second measurement (block 640). For example, the first node may compare the first measurement and the second measurement, as described above.

As further shown in FIG. 6, process 600 may include determining, based on comparing the first measurement and the second measurement, that the traffic metric is enhanced on the second route path relative to the first route path (block 650). For example, the first node may determine, based on comparing the first measurement and the second measurement, that the traffic metric is enhanced on the second route path relative to the first route path, as described above.

As further shown in FIG. 6, process 600 may include causing, via a high-availability link between the first node and the second node, the second node to become the active node for routing the session traffic between the first endpoint and the second endpoint (block 660). For example, the first node may cause, via a high-availability link between the first node and the second node, the second node to become the active node for routing the session traffic between the first endpoint and the second endpoint, as described above.

Process 600 may include additional implementations, such as any single implementation or any combination of implementations described below and/or in connection with one or more other processes described elsewhere herein.

In a first implementation, the first endpoint is associated with a session service provider that provides the session traffic to the second endpoint, wherein the session traffic is associated with a session of a service provider associated with the first endpoint or the second endpoint, and wherein the first measurement is compared with the second measurement based on the service provider being subscribed to the high-availability service.

In a second implementation, alone or in combination with the first implementation, the first node is a first high-availability node of a first high-availability cluster, and the second node is a second high-availability node of a second high-availability cluster that is separate from the first high-availability cluster.

In a third implementation, alone or in combination with one or more of the first and second implementations, the second measurement is received via the high-availability link that connects the first node and the second node.

In a fourth implementation, alone or in combination with one or more of the first through third implementations, the second node is a high-availability node of a high-availability cluster that is a backup cluster for the session traffic.

In a fifth implementation, alone or in combination with one or more of the first through fourth implementations, determining the first measurement of the traffic metric includes transmitting probe messages to the first endpoint and the second endpoint, receiving response messages from the first endpoint and the second endpoint, and determining the first measurement based on the response messages.

In a sixth implementation, alone or in combination with one or more of the first through fifth implementations, causing the second node to become the active node includes sending, via the high-availability link, a switchover notification to the second node, wherein the switchover notification indicates that the second node is to be the active node and the first node is to be a backup node associated with the high-availability service.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

Figure 7:
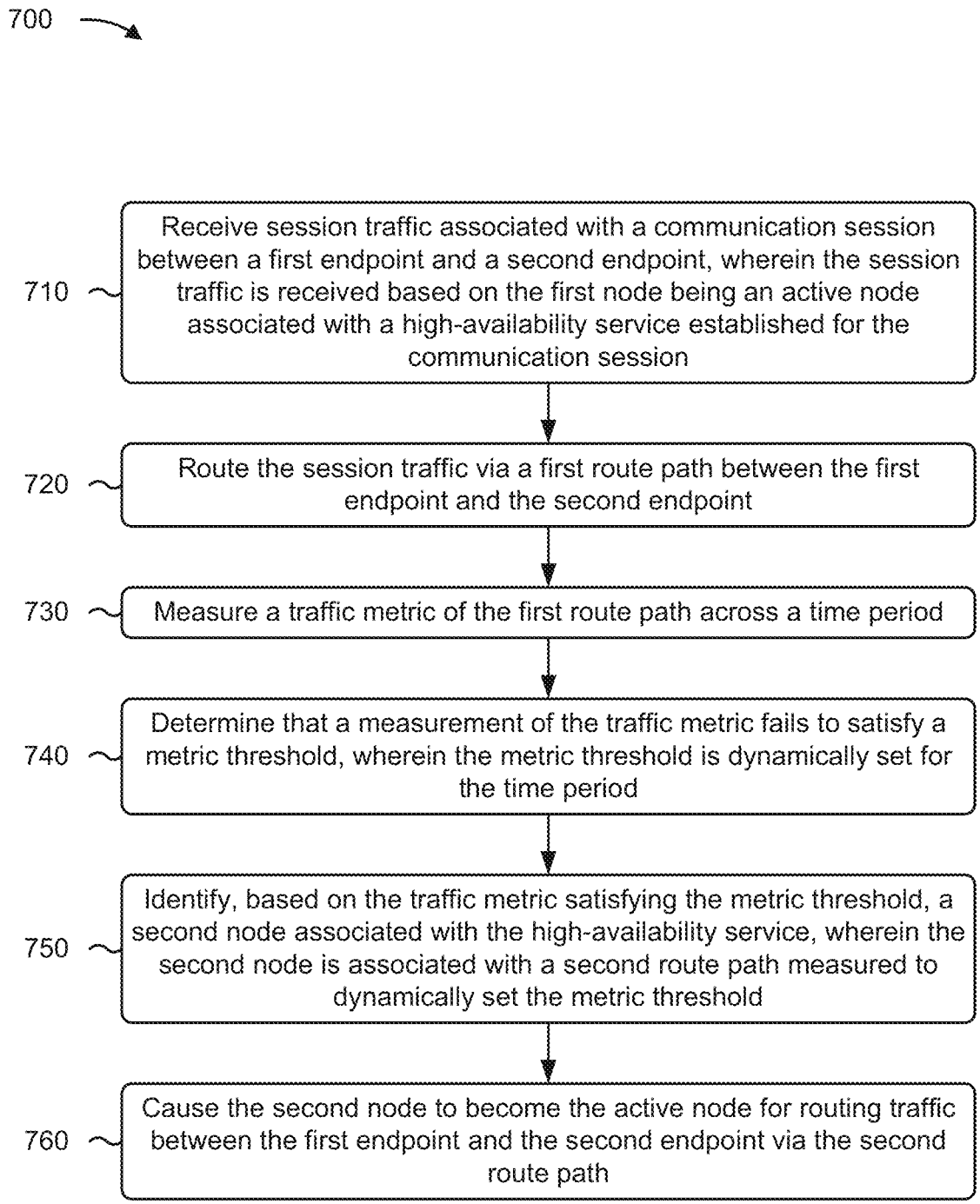

FIG. 7 is a flowchart of an example process 700 associated with high-availability switchover based on traffic metrics. In some implementations, one or more process blocks of FIG. 5 may be performed by a first node (e.g., node 220). In some implementations, one or more process blocks of FIG. 5 may be performed by another device or a group of devices separate from or including the node, such as an endpoint device (e.g., endpoint device 240). Additionally, or alternatively, one or more process blocks of FIG. 5 may be performed by one or more components of device 300, such as processor 320, memory 330, storage component 340, input component 350, output component 360, and/or communication component 370; one or more components of device 400, such as input component 410, switching component 420, output component 430, and/or controller 440; and/or the like.

As shown in FIG. 7, process 700 may include receiving session traffic associated with a communication session between a first endpoint and a second endpoint, wherein the session traffic is received based on the first node being an active node associated with a high-availability service established for the communication session (block 710). For example, the first node may receive session traffic associated with a communication session between a first endpoint and a second endpoint, as described above. In some implementations, the session traffic is received based on the first node being an active node associated with a high-availability service established for the communication session.

As further shown in FIG. 7, process 700 may include routing the session traffic via a first route path between the first endpoint and the second endpoint (block 720). For example, the first node may route the session traffic via a first route path between the first endpoint and the second endpoint, as described above.

As further shown in FIG. 7, process 700 may include measuring a traffic metric of the first route path across a time period (block 730). For example, the first node may measure a traffic metric of the first route path across a time period, as described above.

As further shown in FIG. 7, process 700 may include determining that a measurement of the traffic metric fails to satisfy a metric threshold, wherein the metric threshold is dynamically set for the time period (block 740). For example, the first node may determine that a measurement of the traffic metric fails to satisfy a metric threshold, as described above. In some implementations, the metric threshold is dynamically set for the time period.

As further shown in FIG. 7, process 700 may include identifying, based on the traffic metric satisfying the metric threshold, a second node associated with the high-availability service, wherein the second node is associated with a second route path measured to dynamically set the metric threshold (block 750). For example, the first node may identify, based on the traffic metric satisfying the metric threshold, a second node associated with the high-availability service, as described above. In some implementations, the second node is associated with a second route path measured to dynamically set the metric threshold.

As further shown in FIG. 7, process 700 may include causing the second node to become the active node for routing traffic between the first endpoint and the second endpoint via the second route path (block 760). For example, the first node may cause the second node to become the active node for routing traffic between the first endpoint and the second endpoint via the second route path, as described above.

Process 700 may include additional implementations, such as any single implementation or any combination of implementations described below and/or in connection with one or more other processes described elsewhere herein.

In a first implementation, the first route path traverses a first network associated with a first network service provider and the second route path traverses a second network associated with a second network service provider.

In a second implementation, alone or in combination with the first implementation, the measurement is a first measurement of the traffic metric, and determining that the measurement fails to satisfy the metric threshold includes receiving, via a high-availability link between the first node and the second node, a second measurement of the traffic metric that is associated with the second route path, establishing the second measurement as the metric threshold, and comparing the first measurement to the metric threshold to determine that the first measurement fails to satisfy the metric threshold.

In a third implementation, alone or in combination with one or more of the first and second implementations, the traffic metric is measured based on at least one of one or more dynamic probing messages that are transmitted and received between the first node and the first endpoint, or one or more dynamic probing messages that are transmitted and received between the first node and the second endpoint.

In a fourth implementation, alone or in combination with one or more of the first through third implementations, the traffic metric comprises at least one of a latency metric, a bandwidth metric, or a jitter metric.

In a fifth implementation, alone or in combination with one or more of the first through fourth implementations, causing the second node to become the active node includes sending, via a high-availability link, a switchover notification to the second node, wherein the switchover notification indicates that the second node is to be the active node for processing the session traffic and the first node is to be a backup node according to the high-availability service, receiving, via the high-availability link and from the second node, a confirmation message that indicates that the second node is the active node and instructs the first node to be the backup node, and causing the first node to be the backup node.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
  monitoring, by a first node of a first high-availability cluster, session traffic communicated via a first route path between a first endpoint and a second endpoint,
    wherein the first high-availability cluster is within the first route path, and
    wherein the first high-availability cluster includes an active node for routing the session traffic routed between the first endpoint and the second endpoint;

determining, by the first node, a first measurement of a traffic metric associated with the first route path,
    wherein the traffic metric is associated with a time period, and
    wherein determining the first measurement comprises:
        determining the first measurement by comparing a time of transmission of one or more probe messages and a time of receipt of one or more corresponding response messages;
receiving, by the first node and from a second node of a second high-availability cluster, a second measurement of the traffic metric that is associated with the time period,
    wherein the second high-availability cluster is within a second route path between the first endpoint and the second endpoint, and
    wherein receiving the second measurement comprises:
        receiving the second measurement based on response messages received by the second node during the time period;
comparing, by the first node, the first measurement and the second measurement;
determining, by the first node and based on comparing the first measurement and the second measurement, that the traffic metric is enhanced on the second route path relative to the first route path; and
causing, by the first node, the second high-availability cluster to establish a new active node for routing the session traffic between the first endpoint and the second endpoint.

2. The method of claim 1, wherein the second node is a primary node of the second high-availability cluster.

3. The method of claim 1, wherein the second measurement is received via a high-availability link that connects the first high-availability cluster and the second high-availability cluster.

4. The method of claim 1, wherein the second high-availability cluster is a backup cluster for the session traffic.

5. The method of claim 1, wherein determining the first measurement of the traffic metric comprises:
    performing a dynamic probing of the first route path by:
        transmitting probe messages to the first endpoint and the second endpoint, and
        receiving response messages from the first endpoint and the second endpoint.

6. The method of claim 1, wherein causing the second high-availability cluster to establish the new active node comprises:
    sending, via a high-availability link, a switchover notification to the second node,
        wherein the switchover notification indicates that the second node is to cause a member node of the second high-availability cluster to be the active node for routing the session traffic.

7. The method of claim 1, further comprising:
receiving, from the second node, a confirmation message that identifies that the second high-availability cluster has established the new active node; and
designating, based on receiving the confirmation message, a third node of the first high-availability cluster as a backup node for subsequent session traffic.

8. A first node, comprising:
one or more memories; and
one or more processors to:
    route session traffic communicated via a first route path between a first endpoint and a second endpoint,
        wherein the first node is an active node that routes the session traffic between the first endpoint and the second endpoint via the first route path according to a high-availability service;
    determine a first measurement of a traffic metric of the first route path,
        wherein the traffic metric is associated with a time period, and
        wherein the one or more processors, to determine the first measurement, are to:
            determine the first measurement by comparing a time of transmission of one or more probe messages and a time of receipt of one or more corresponding response messages;
    receive, from a second node associated with the high-availability service, a second measurement of the traffic metric that is associated with the time period,
        wherein the second measurement is associated with a second route path,
        wherein the one or more processors, to receive the second measurement, are to:
            receive the second measurement based on response messages received by the second node during the time period;
    compare the first measurement and the second measurement;
    determine, based on comparing the first measurement and the second measurement, that the traffic metric is enhanced on the second route path relative to the first route path; and
    cause, via a high-availability link between the first node and the second node, the second node to become the active node for routing the session traffic between the first endpoint and the second endpoint.

9. The first node of claim 8, wherein the first endpoint is associated with a session service provider that provides the session traffic to the second endpoint,
    wherein the session traffic is associated with a session of a service provider associated with the first endpoint or the second endpoint,
    wherein the first measurement is compared with the second measurement based on the service provider being subscribed to the high-availability service.

10. The first node of claim 8, wherein the first node is a first high-availability node of a first high-availability cluster and the second node is a second high-availability node of a second high-availability cluster that is separate from the first high-availability cluster.

11. The first node of claim 8, wherein the second measurement is received via the high-availability link that connects the first node and the second node.

12. The first node of claim 8, wherein the second node is a high-availability node of a high-availability cluster that is a backup cluster for the session traffic.

13. The first node of claim 8, wherein the one or more processors, when determining the first measurement of the traffic metric, are to:
    transmit probe messages to the first endpoint and the second endpoint;
    receive response messages from the first endpoint and the second endpoint; and
    determine the first measurement based on the response messages.

14. The first node of claim 8, wherein the one or more processors, when causing the second node to become the active node, are to:

send, via the high-availability link, a switchover notification to the second node,
  wherein the switchover notification indicates that the second node is to be the active node and the first node is to be a backup node associated with the high-availability service.

15. A non-transitory computer-readable medium storing a set of instructions, the set of instructions comprising:
one or more instructions that, when executed by one or more processors of a first node, cause the first node to:
  receive session traffic associated with a communication session between a first endpoint and a second endpoint,
    wherein the session traffic is received based on the first node being an active node associated with a high-availability service established for the communication session;
  route the session traffic via a first route path between the first endpoint and the second endpoint;
  measure a traffic metric of the first route path across a time period,
    wherein the one or more instructions, that cause the first node to measure the traffic metric, cause the first node to:
      measure the traffic metric by comparing a time of transmission of one or more probe messages and a time of receipt of one or more corresponding response messages;
  determine that a measurement of the traffic metric fails to satisfy a metric threshold,
    wherein the metric threshold is dynamically set for the time period;
  identify, based on the traffic metric satisfying the metric threshold, a second node associated with the high-availability service,
    wherein the second node is associated with a second route path measured to dynamically set the metric threshold; and
  cause the second node to become the active node for routing traffic between the first endpoint and the second endpoint via the second route path.

16. The non-transitory computer-readable medium of claim 15, wherein the first route path traverses a first network associated with a first network service provider and the second route path traverses a second network associated with a second network service provider.

17. The non-transitory computer-readable medium of claim 15, wherein the measurement is a first measurement of the traffic metric, and
  wherein the one or more instructions, that cause the first node to determine that the measurement fails to satisfy the metric threshold, cause the first node to:
    receive, via a high-availability link between the first node and the second node, a second measurement of the traffic metric that is associated with the second route path;
    establish the second measurement as the metric threshold; and
    compare the first measurement to the metric threshold to determine that the first measurement fails to satisfy the metric threshold.

18. The non-transitory computer-readable medium of claim 15, wherein the traffic metric is measured based on at least one of:
  one or more dynamic probing messages that are transmitted and received between the first node and the first endpoint; or
  one or more dynamic probing messages that are transmitted and received between the first node and the second endpoint.

19. The non-transitory computer-readable medium of claim 15, wherein the traffic metric comprises at least one of:
  a latency metric;
  a bandwidth metric; or
  a jitter metric.

20. The non-transitory computer-readable medium of claim 15, wherein the one or more instructions, that cause the first node to cause the second node to become the active node, cause the first node to:
  send, via a high-availability link, a switchover notification to the second node,
    wherein the switchover notification indicates that the second node is to be the active node for processing the session traffic and the first node is to be a backup node according to the high-availability service;
  receive, via the high-availability link and from the second node, a confirmation message that indicates that the second node is the active node and instructs the first node to be the backup node; and
  cause the first node to be the backup node.

* * * * *